United States Patent [19]

Toothaker

[11] Patent Number: 4,554,433

[45] Date of Patent: Nov. 19, 1985

[54] WELDING CONDUIT STOP

[75] Inventor: David L. Toothaker, Wichita, Kans.

[73] Assignee: Tweco Products, Inc., Wichita, Kans.

[21] Appl. No.: 637,427

[22] Filed: Aug. 3, 1984

[51] Int. Cl.[4] .............................................. B23K 9/00
[52] U.S. Cl. ............................ 219/137.63; 219/137.31
[58] Field of Search ..................... 219/137.31, 137.63, 219/137.9

[56] References Cited

U.S. PATENT DOCUMENTS 3,629,547 12/1971 Kester et al. .............. 219/137.63 X
4,297,561 10/1981 Townsend et al. ............ 219/137.63

Primary Examiner—C. L. Albritton
Assistant Examiner—Alfred S. Keve
Attorney, Agent, or Firm—Majestic, Gallagher, Parsons & Siebert

[57] ABSTRACT

A welding gun apparatus to supply welding wire, electrical power, and shielding gas to a working area includes a connector plug with a conduit stop therein. The conduit stop is fittedly received within a bore in the connector plug and is of unitary one-piece construction so as to provide a fluid-tight fit therewith.

5 Claims, 5 Drawing Figures

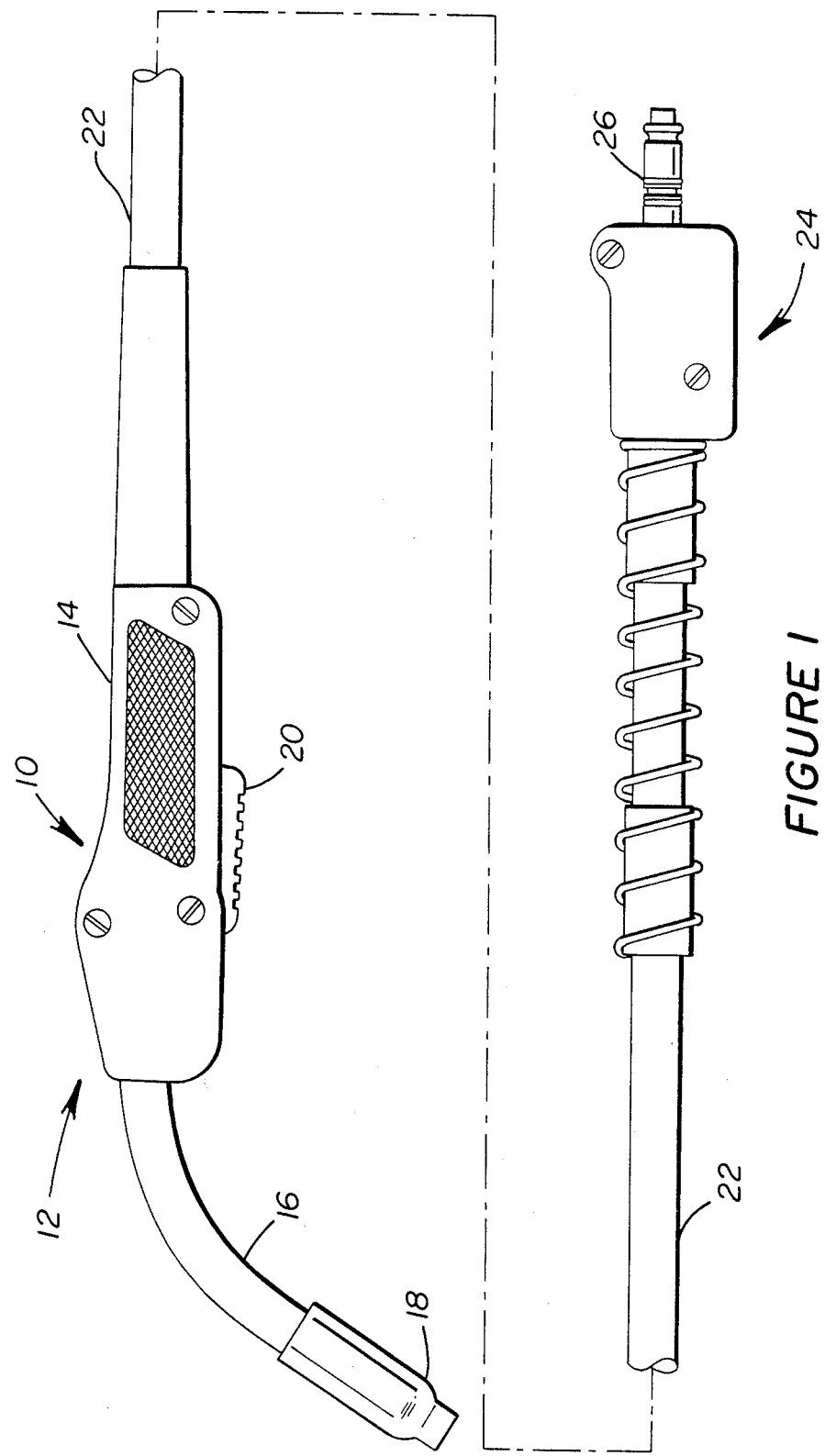

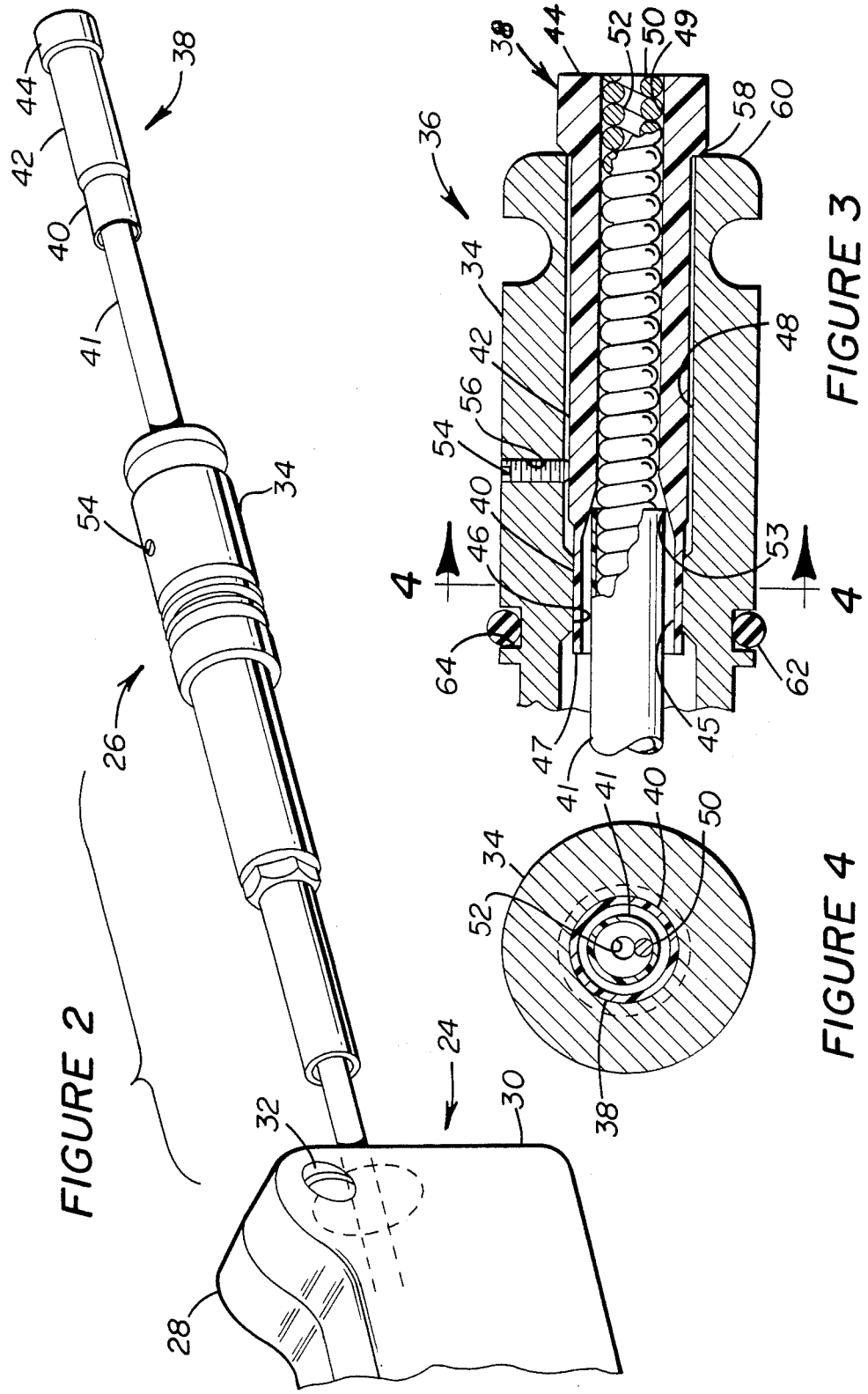

WELDING CONDUIT STOP

BACKGROUND OF THE INVENTION

1. Field of the Invention

This invention relates generally to a welding gun apparatus, and more particularly, relates to an improved conduit stop for such apparatus.

2. Description of the Prior Art

Welding devices in which welding wire, electrical power and shielding gas are supplied to a working area are well known in the prior art. These devices usually have a supply adapter assembly, a quick connector assembly, and a cable assembly connected to the welding gun assembly. Typically, provision is also made for a coolant to be provided and circulated to the welding gun assembly for cooling purposes.

U.S. Pat. No. 3,629,547, assigned to the assignee hereof, shows such a prior art device. U.S. Pat. No. 4,297,561, also assigned to the assignee hereof, shows another prior art device.

This invention is designed to be an improvement over the inventions which are the subject matter of said patents. In the devices shown in said patents, a connector plug assembly is provided so as to permit quick connecting and disconnecting to a supply adapter assembly to transfer gas, welding wire, and electrical power to the welding gun assembly.

This invention is directed to an improvement in the connector plug assembly in the form of an integral one-piece conduit stop adapted to be press-fit within the connector plug of said connector plug assembly. Formerly, the conduit stop was made of two parts, one being neoprene for sealing purposes, and the other being of brass material. This two-piece assembly requires extra production steps and is therefore more costly to produce than a one-piece conduit stop. A leakage problem may also be engendered by the two-piece construction. This is eliminated by the one-piece, integral construction conduit stop of the instant invention.

SUMMARY AND OBJECTS OF THE INVENTION

The invention is directed to an integral one-piece conduit stop which is adapted to be fitted within the bore of a connector plug of a connector plug assembly. The conduit stop external diameter and internal bore of the connector plug of the connector plug assembly are so dimensioned as to provide for a tight seal for preventing the passage of unwanted fluid therearound.

Accordingly, it is an object of this invention to provide an integral, one-piece conduit stop which securely seals within an accommodating bore of a connector plug.

It is another object of this invention to provide a welding conduit stop which is of integral, one-piece construction which requires less fabricating to produce.

It is a further object of this invention to provide a welding conduit stop having an efficient fit with an accommodating connector plug so as to provide efficient sealing.

It is also an object of this invention to provide such a seal by providing a thin unsupported wall on the sealing portion of the conduit stop so as to produce a positive seal without a hard or stiff press fit.

It is a still further object of this invention to provide a welding conduit stop which is simpler and less costly to produce.

Further and other objects and advantages of this invention will become apparent from the study of the following description and attached drawings.

BRIEF DESCRIPTION OF THE DRAWINGS

FIG. 1 is a side elevation view of a welding gun apparatus comprising a welding gun assembly, a cable assembly, and a quick connector block assembly;

FIG. 2 is an exploded view of the connector block assembly and the connector plug assembly;

FIG. 3 is a side partial elevational view in cross-section of the connector plug assembly, including a conduit assembly therein;

FIG. 4 is a cross-sectional view taken along the lines 4—4 in FIG. 3; and

DETAILED DESCRIPTION OF THE PREFERRED EMBODIMENT

Figure 5:
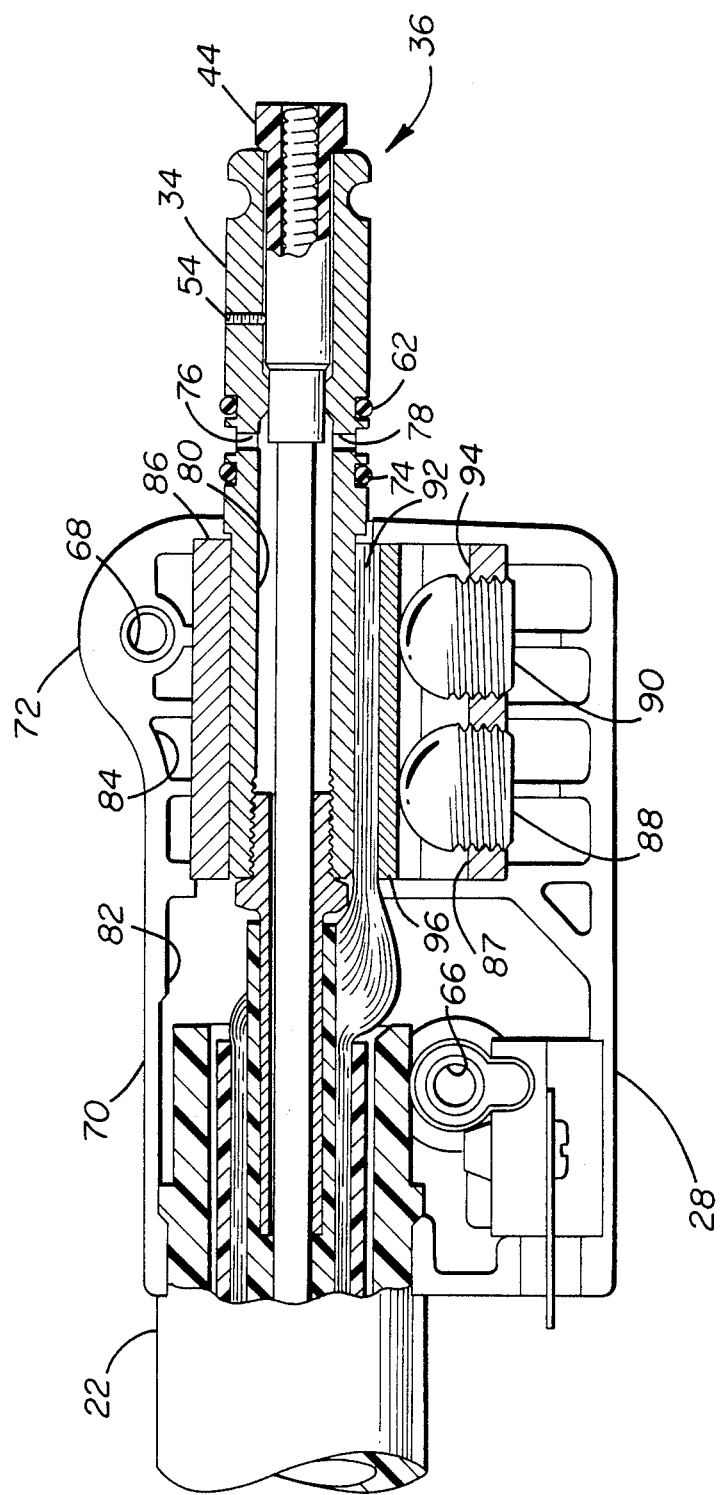
FIG. 5 is an elevational cross-sectional view of the connector block assembly showing details thereof.

As seen in FIG. 1, a welding gun assembly is shown generally at 10. The welding gun assembly consists of a welding gun shown generally at 12 consisting of a handle 14 having a supply tube assembly 16 extending from the forward portion thereof and supporting a nozzle tip member 18. A trigger switch 20 depends from the underside of the handle for purposes of actuation of the power supply and welding wire feeder (not shown).

Electric power, welding wire, and inert welding gas such as helium or argon for shielding purposes are supplied to the welding gun through cable assembly 22. Cable assembly 22 terminates in connector block assembly 24. The generally elongated connector plug assembly 26 extends from an end of the connector block assembly and is adapted to cooperatively engage and be inserted within a supply adapter assembly (not shown) to transfer gas, welding wire, and electrical power to the welding gun assembly.

Turning to FIG. 2, the connector block assembly 24 is in turn comprised of generally rectangular and mating, right and left connector cases 28, 30 fastened together by binder screw 32. Extending from the right portion of the connector block assembly 24 is a connector plug assembly 26 as previously mentioned. The connector plug assembly consists of a generally elongated connector plug 34 having a conduit assembly 36 fitted therein as also seen in FIGS. 3 and 4.

The conduit assembly 36 includes a generally elongated conduit stop 38. The conduit stop 38 is generally cylindrical and has a smaller diameter portion 40, an intermediate diameter portion 42 of slightly larger diameter than the smaller diameter portion, and a larger diameter portion 44 which is larger than the intermediate diameter portion. An enlarged internal bore 45 is included within the smaller diameter portion 40 and is dimensioned slightly less than the diameter of the smaller portion so as to produce a thin wall 47. A second bore 49 of a diameter less than that of bore 45 extends through the larger and intermediate diameter portions of conduit stop 38. The smaller diameter portion 40 is interference fitted within corresponding concentric bore 46 within connector plug 34. Because the wall 47 is thin, and does not fit tight to coiled wire 50, the wall is able to deform and positive seal is produced without a hard or stiff press fit.

Conduit assembly 36 also includes a centrally disposed helical coil of wire 50 defining a central weld wire bore 52 for passage of welding wire (not shown). A cylindrical sheath 41 of resilient material such as plastic is formed over a portion of wire 50 and abuts generally frustoconical surface 53 formed within conduit stop 38. Small set screw 54 threadably contained within an accommodating threaded bore 56 is used to secure the conduit stop within its accommodating bores 46, 48. An annular portion 58 on conduit stop 38 abuts against end wall 60 of connector plug 34 to also assist in preventing lateral motion of conduit stop 38 with respect to connector plug 34. Conduit stop 38 may typically be made of resilient material such as nylon plastic.

Connector plug 34, on the other hand, is made of copper material because of its good electrical conductive properties. O-rings, one of which is shown at 62, are contained within accommodating O-ring grooves which is shown at 64 so that the connector plug is sealed within an accommodating bore (not shown) as will be more fully described hereinafter.

As shown in FIG. 5, connector block assembly 24 is formed by a pair of cooperating substantially identical left and right connector cases, one of which is shown at 28. The connector cases are held together by means of binder screws (not shown) which are threadably fitted within sleeves 66, 68 within the connector case 28. The outer contour of the connector housing 28 is of irregular shape and having a central portion 70 adapted to be manually grasped and having an upper arcuate portion 72 for receiving thumb pressure. In this manner, the connector block assembly 24 may be moved to the right where it is seen in the drawing, so as to insert the connector plug 34 into the accommodating supply adapter assembly (not shown).

When positioned in the supply adapter assembly, O-ring 62 together with spaced-together O-ring 74 seals against an accommodating bore (not shown) in said adapter assembly. In this manner, inert gas may be admitted through a plurality of radially directed passages two of which are shown at 76, 78 within connector plug 34. The inert gas may then pass longitudinally through elongated bore 80 within the connector plug 34. It should be noted that the interior of the connector cases 28, 30 are formed with irregular cavities such as cable cavity 82 and cable connector block cavity 84.

A cable connector block 86 is mounted in cavity 84 and has a lower portion thereof adapted to threadably receive a pair of ballpoint set screws 88, 90 which have hexagonal socket heads to secure a stranded conductor portion 92 of cable assembly 22 thereto, as will be described. The cable connector block 86 is of generally rectangular shape having an elongated slot 87 therethrough. The cable connector block 86 is made of conductive material such as copper so as to provide electrical continuity.

Ballpoint set screws 88 and 90 may be turned so as to force the conductor portion 92 against connector plug 34 through an intermediate elongated separator 96 so as to provide good electrical contact.

It is to be understood that while the invention has been described above in conjunction with the preferred specific embodiment thereof, that the description is intended to illustrate and not limit the scope of the invention, which is defined by the scope of the appended claims.

What is claimed is:

1. In a welding gun apparatus for supplying welding wire, electrical power, and shielding gas to a working area, including:

a. a connector block assembly adapted to be releasably connected to a supply adapter assembly to receive a shielding gas, welding wire, and electrical power therefrom,
  b. a cable assembly having one end connected to said connector block assembly for conveying shielding gas, welding wire, and electrical power,
  c. a welding gun assembly connected to an end of said cable assembly,
  d. said connector block assembly having a generally elongated connector plug extending from an end thereof,
  e. said connector plug having an axial bore therethrough,
  f. a generally elongated conduit stop fitted within said axial bore and extending from one end thereof,
  g. wherein the improvement comprises said conduit stop being of resilient plastic material and unitary one-piece construction.

2. The invention of claim 1 wherein said axial bore is stepped, having a smaller and a larger diameter portion, and wherein said conduit stop has corresponding smaller and intermediate diameter portions adapted to fit, respectively, said smaller and said larger bores.

3. The invention of claim 2 wherein said conduit stop is dimensioned with respect to said bore so as to provide an interference fit and further including a first internal bore within said smaller diameter portion having a diameter less than the diameter of said smaller diameter portion, thereby producing a thin wall capable of being deformed so as to provide a positive seal.

4. A welding gun apparatus for supplying welding wire, electrical power, and shielding gas to a working area, including:

a. a connector block assembly adapted to be releasably connected to a supply adapter assembly to receive a shielding gas, welding wire, and electrical power therefrom,
  b. a cable assembly having one end connected to said connector block assembly for conveying shielding gas, welding wire, and electrical power,
  c. a welding gun assembly connected to an end of said cable assembly,
  d. said connector block assembly having a generally elongated connector plug extending from an end thereof,
  e. said connector plug having an axial bore therethrough, said axial bore being stepped, having a smaller and a larger diameter portion,
  f. a generally elongated conduit stop fitted within said axial bore and extending from one end thereof, said conduit stop having corresponding smaller and intermediate diameter portions adapted to fit, respectively, said smaller and said larger bores, said conduit stop dimensioned with respect to said bore so as to provide an interference fit, including a first internal bore within said smaller diameter portion having a diameter less than the diameter of said smaller diameter portion, thereby producing a thin wall capable of being deformed so as to provide a positive seal and a second internal bore in said conduit stop of a diameter less than that of said first internal bore and extending substantially through said intermediate and larger diameter portions, said first and second bores being joined by an intermediate frustoconical portion,
  g. said conduit stop being of unitary one-piece construction.

5. The invention of claim 3 wherein said resilient material is nylon plastic.

* * * * *